United States Patent [19]

Miller, deceased

[11] 3,875,960
[45] Apr. 8, 1975

[54] DIVERTER FAUCET VALVE CONSTRUCTION

[76] Inventor: Larry J. Miller, deceased, late of Box 1475, Fort Lauderdale, Fla. by C. Phyllis Miller, personal representative

[22] Filed: Oct. 31, 1973

[21] Appl. No.: 411,443

Related U.S. Application Data

[63] Continuation-in-part of Ser. No. 241,958, April 7, 1972.

[52] U.S. Cl. ............................................. 137/119
[51] Int. Cl. ............................................ F16k 11/06
[58] Field of Search .................. 137/119, 597, 625.4

[56] References Cited
UNITED STATES PATENTS

| | | | |
|---|---|---|---|
| 3,056,418 | 10/1962 | Adams et al. | 137/119 |
| 3,372,710 | 3/1968 | Miller | 137/597 X |
| 3,461,901 | 8/1969 | Bucknell et al. | 137/119 |
| 3,499,440 | 3/1970 | Gibbs | 137/119 X |
| 3,526,250 | 9/1970 | Miller | 137/625.4 |
| 3,667,503 | 6/1972 | Farrell | 137/625.4 |

*Primary Examiner*—Robert G. Nilson
*Attorney, Agent, or Firm*—Barnes, Kisselle, Raisch & Choate

[57] ABSTRACT

A faucet valve comprising a body having a cylindrical opening therein into which hot and cold water inlets extend. A control disc is movable in said opening to selectively uncover said inlets. The control disc is operated by a lever which is swivelly mounted in the body. A diverter is mounted in the body and is connected in such a manner by passages to the chamber to divert water from the chamber.

3 Claims, 4 Drawing Figures

DIVERTER FAUCET VALVE CONSTRUCTION

This application is a continuation-in-part of my application Ser. No. 241,958, filed Apr. 7, 1972.

This invention relates to faucet valves and particularly such faucet valves embodying a diverter valve.

In my prior U.S. Pat. Nos. Reissue 25,036 issued Jan. 19, 1971 and 3,526,250 issued Sept. 1, 1970, there are disclosed and claimed single handle faucet valves of a novel design.

In prior art faucet valves, it is conventional to utilize in association therewith a diverter valve that is operable to divert water from the spout where it normally flows to a flexible hose or similar spray device. Because of the size of the diverter valve, it is necessary to make the body larger in order to mount the valve within the body resulting in a substantial increase in overall size of the faucet.

Among the objects of the invention are to provide an improved faucet valve which includes a diverter in the valve body; wherein adequate flow is diverted; wherein the faucet valve incorporates the diverter valve without increase of the overall size thereof.

DESCRIPTION

Figure 1:
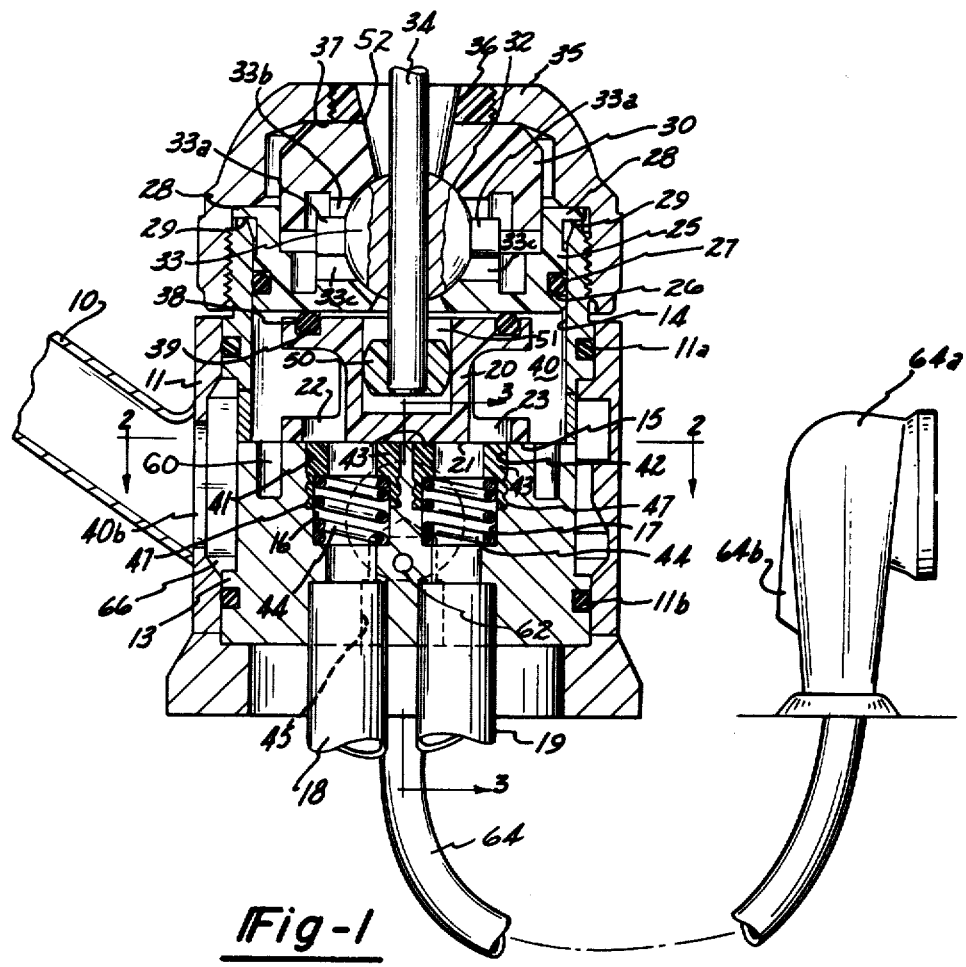
FIG. 1 is a vertical sectional view through a valve embodying the invention.
Figure 2:
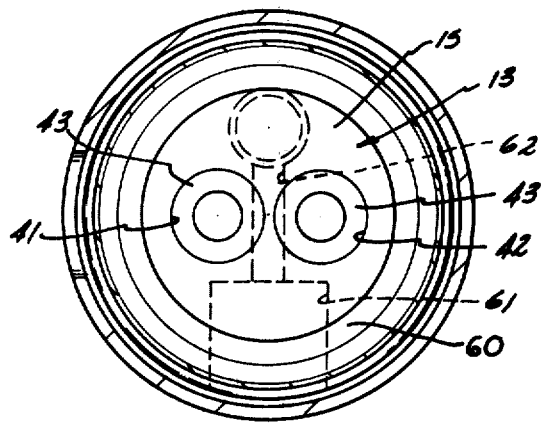
FIG. 2 is a fragmentary sectional view taken along the line 2—2 in FIG. 1.

Referring to FIG. 1, the faucet valve embodying the invention is adapted to be used with various spout configurations, including the type shown in FIG. 1 wherein a spout 10 has a sleeve or cylinder 11 attached thereto and rotatably mounted on the single handle faucet valve.

The single handle faucet valve comprises a body 13 that is formed with a cylindrical chamber or opening 14 that opens upwardly to the upper end of the body. The bottom surface 15 of the chamber 14 is substantially flat and inlet passages 16, 17 extend upwardly from the bottom of the body through the surface 15. Hot and cold water, respectively, are supplied to the passages 16, 17 through inlet pipes 18, 19 which are swaged or otherwise provided in the openings.

A sealing disc 20, which is preferably made of a low friction plastic material that is rigid, nondeformable and resistant to hot water, such as Delrin, is provided in the chamber 14. Control disc 20 is formed with a substantially flat bottom surface 21 that engages the flat surface 15 of the chamber 14. The disc 20 is provided with non-circular openings 22, 23 that are adapted to be moved into registry with the upper ends of openings 16, 17. The disc 20 is generally triangular in shape and the sides thereof are convex.

A sealing member 25 is provided in the upper end of chamber 14 and has a peripheral circular groove 26 in which an O-ring 27 of resilient material such as synthetic rubber is provided to form a seal with the wall of the chamber 14. The upper end of sealing member 25 is provided with radially extending diametrically opposed projections 28 that extend into complementary depressions 29 in the upper end of the body 13 and thereby prevent rotation of the sealing member 25 relative to the body 13. A retaining member 30 of low friction material similar to the material of which the sealing member 25 is made is provided on the upper end of the body. Sealing member 25 and retaining member 30 have spherical seats 31, 32, respectively, which engage spherical member 33, preferably of material that is dissimilar to that of members 25, 30 such as brass, that is fixed intermediate the ends of an operating lever 34. The retaining member 30 is urged downwardly against the spherical member 33 by a cap 35 that is threaded on the upper end of the body 13. An adjusting ring 36 is threaded in an opening in the upper end of the cap 35 and engages a shoulder 37 on the retaining member 30. The force of the retaining member 30 on the spherical member 33 and, in turn, the sealing disc 25 urges the sealing disc 25 downwardly against an O-ring 38 that is provided in a groove 39 in the upper end of the control disc 20 thereby yieldingly urging the control disc 20 downwardly and causing the flat surface 21 of the control disc to engage the flat surface 15 of the chamber 14. By this arrangement, water may flow upwardly into chamber 40 but is prevented by O-ring 38 and O-ring 27 from moving upwardly and outwardly of the body 13.

Spherical member 33 has outwardly extending diametrical projections 33a which extend into slots formed by aligned grooves 33b, 33c in the retaining member 30 and sealing disc 25. By this arrangement, the movement of the lever 34 laterally as viewed in FIG. 1 is limited to a single vertical plane. This, in turn, limits the resultant movement of the control member 20.

The upper ends 41, 42 of the inlet passages 16, 17 are enlarged to receive annular sealing members 43 of rubber or other suitable resilient material to provide a seal with the undersurface 21 of the control disc 20. In order to insure this seal, coil springs 44 are compressed between shoulders on the body and shoulders on the sealing rings 43. In addition, to insure that water will not seep between the surfaces of the enlarged openings 41, 42 and the respective sealing members 43, the lower end of each sealing member 43 has a bead 47 on the outer surface thereof integral with the member to provide a secondary seal in the nature of an O-ring seal.

An interconnecting member 50 of low friction material such as Delrin is fixed on the lower end of the lever 34 as by press fitting the member on a non-circular portion of the lever which preferably has a D cross section. The spherical member 50 has a D cross section and engages D-shaped opening 51 in the upper end of the control disc 20 which has a complementary D cross section and vertical side walls. By this arrangement, oscillation of the control lever 34 will translate the control disc 20 along surface 15 without losing the sealing engagement of the control disc 20 with the surface 15.

The lever 34 is substantially circular in cross section and extends upwardly through an opening in the sealing disc 25 and through an intermediate opening 52 in the retaining member 30. The opening 52 has a generally triangular shape as viewed from above and the sides of the opening are engaged by the lever 34 to confine the movement of the lever to a generally triangular area.

A knob (not shown) is fixed on the upper end of the lever 34.

Retaining member 30 has a non-circular cross section and extends downwardly to a complementary opening in the upper end of the sealing member 25.

By swinging the control knob (not shown) on the end of lever 34 and, in turn, the lever 34, the openings 22, 23 in the control disc are moved from positions in registry with the inlets 16, 17 to positions out of registry thereby controlling the total amount of water flowing through the inlets into the chamber or space 40 and through an opening 40b to the spout 10 as presently described. O-rings 11a and 11b provide a seal between sleeve 11 and body 13.

By swinging the lever back and forth, the extent of communication or registry of the openings 22, 23 with the passages 16, 17 is controlled. Thus, by moving the lever to the left or counterclockwise as shown in FIG. 1, substantially the entire opening 22 may be brought into registry with the inlet passage 16 and the opening 23 moved out of registry with the inlet 17 so that only hot water will flow.

Figure 3:
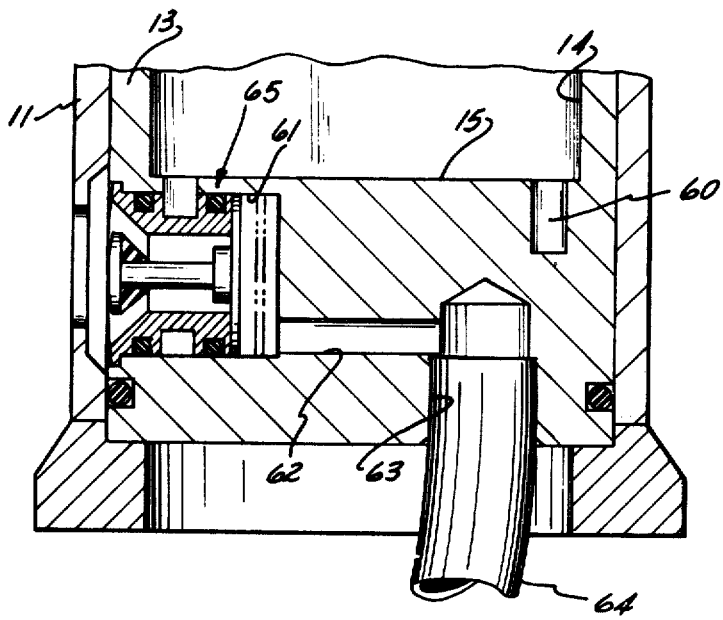
FIG. 3 is a fragmentary sectional view taken along the line 3—3 in FIG. 1.

Referring to the drawings, in accordance with the invention, provision is made for a diverter valve which is operable to divert the water to a spray nozzle and the like. Referring to FIG. 3, the valve body 13 is formed with a groove 60 in surface 15. A cylindrical opening 61 extends from the side of body 13 radially inwardly and intersects the groove 60. A radial passage 62 extends from the chamber 61 to an axial opening 63 that extends to the bottom surface of the body 13. A hose 64 in turn is positioned in the opening 63 and extends to a spray head 64a having a finger operated valve 64b of conventional construction. As shown in FIG. 1, passage 62 extends through the portion of body 13 between the inlets 18, 19.

A diverter assembly 65 is positioned in a cylindrical chamber 61 and includes body 66 which is cylindrical and has spaced flanges 66a, 66b. O-rings 67 on flanges 66a, 66b provide a seal with the side wall of the chamber 61. The body has an axial opening 68 therethrough, the outer end of which is tapered. A valve 70 with a frusto-conical end 71 and a flanged end 72 is positioned in the opening. Frusto-conical end 71 comprises a resilient washer 71a forming the frusto-conical surface on the flange 71b. The body 66 includes circumferentially spaced radially extending passages 66c. A washer 73 is fixed on the end of the valve 70 by peening. The central portion 73a of washer 73 is depressed to receive the peened portion 70a so that the end of body 66 and the surface of washer 73 are in the same plane. The diameter of washer 73 is slightly less than that of chamber 61.

Figure 4:
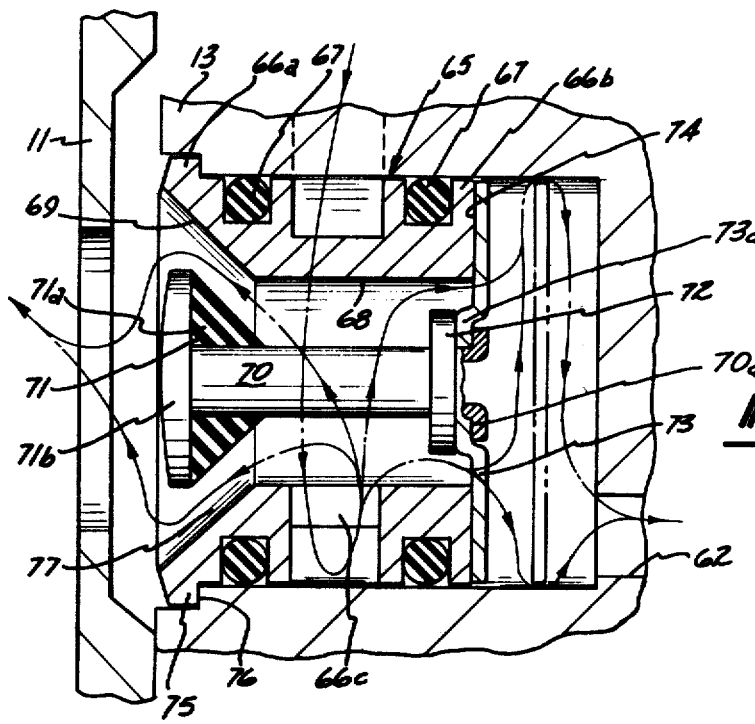
FIG. 4 is a fragmentary sectional view on an enlarged scale of a portion of the structure shown in FIG. 3.

A flange 75 on the free end of the body 66 engages a shoulder 76 to limit the radially inward movement of the body 66 when it is inserted in the chamber 61. In normal operation, the pressure of water flowing from chamber 40, groove 60 and passage 77 formed between frusto-conical end 71 and tapered end 69 maintain the valve 70 with the washer 73 against the shoulder 74 so that the water can pass outwardly. If, however, the valve 64b is depressed, momentarily reducing the pressure, the pressure of water surrounding the valve 70 will force the washer 73 to the dotted line position as shown in FIG. 4 permitting the water to flow through the spray head 64a. At the same time, the resilient seal 71a on the valve 70 seats against the surface 69 to prevent water from flowing outwardly through the spout 10.

The cross sectional area of the groove 60 is sufficiently great to permit adequate flow through the passages 66c, 77 to the spout in normal operation of the faucet. Similarly, the sum of the cross sectional areas of the passages 66c and 77 is sufficiently great to prevent undue restriction of the normal flow of water. The area or space between the peripheral edge of the washer 73 and the periphery of the cavity 61 is preferably not greater than the cross sectional area of the passage 62 so that there is a minimum restriction to flow through the passage 62 to the spray head when the diverter valve is actuated.

By providing the cavity 61 in intersecting relationship to the groove 60 and in close proximity to the inlets 16, 17 and further by providing the passage 62 in parallel axial alignment with the cavity 61 and extending in the portion of the body between the inlets 16, 17 a compact construction is achieved so that the overall size of the faucet is kept at a minimum.

I claim:

1. In a faucet valve, the combination comprising
   a faucet body defining a chamber,
   said chamber having a substantially flat wall surface along one wall,
   hot and cold water inlets extending through said surface to said chamber,
   a control member having a substantially flat surface complementary to said wall surface and adapted to be movable to permit selective flow through said inlets into said chamber,
   said body having an annular groove substantially completely surrounding the wall surface therein and in open communication with said chamber,
   the dimensions of said control member and said wall surface being such that in at least some positions, said control member at least partially overlies and partially obstructs a portion of said groove,
   said body having a cavity extending transversely therein spaced from said wall surface and intersecting said groove and communicating directly with said groove,
   a passage extending from the exterior of said body into said cavity,
   and diverter means in said cavity responsive to differential pressure to provide communication between said chamber and said passage to the exterior of said body.

2. The combination set forth in claim 1 wherein said body includes a second passage extending from said cavity to said passage,
   said second passage extending between the inlets and transversely thereof.

3. The combination set forth in claim 2 wherein said second passage is in parallel axial alignment with said cavity.

* * * * *